(12) United States Patent
Kaku et al.

(10) Patent No.: US 7,394,848 B2
(45) Date of Patent: Jul. 1, 2008

(54) METHOD AND APPARATUS FOR TIME EQUALIZATION

(75) Inventors: Takashi Kaku, Kawasaki (JP); Hiroyasu Murata, Kawasaki (JP); Hideo Miyazawa, Inagi (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 10/347,154

(22) Filed: Jan. 15, 2003

(65) Prior Publication Data

US 2003/0138037 A1 Jul. 24, 2003

Related U.S. Application Data

(63) Continuation of application No. PCT/JP00/08565, filed on Dec. 4, 2000.

(51) Int. Cl.
 *H03H 7/30* (2006.01)

(52) U.S. Cl. ..................................... 375/229

(58) Field of Classification Search .............. 375/229, 375/230, 231, 232, 233, 234, 235, 236
 See application file for complete search history.

(56) References Cited

U.S. PATENT DOCUMENTS

| | | | |
|---|---|---|---|
| 6,370,188 B1 * | 4/2002 | Wu et al. | 375/222 |
| 6,434,205 B1 * | 8/2002 | Taura et al. | 375/355 |
| 6,549,512 B2 * | 4/2003 | Wu et al. | 370/210 |
| 6,678,317 B1 * | 1/2004 | Murakami et al. | 375/232 |
| 6,735,244 B1 * | 5/2004 | Hasegawa et al. | 375/219 |
| 6,834,079 B1 * | 12/2004 | Strait et al. | 375/232 |
| 6,876,675 B1 * | 4/2005 | Jones et al. | 370/509 |
| 6,904,086 B2 * | 6/2005 | Nishimura et al. | 375/232 |
| 2002/0106035 A1 * | 8/2002 | Harikumar et al. | 375/316 |
| 2003/0123490 A1 * | 7/2003 | Kaku et al. | 370/503 |

FOREIGN PATENT DOCUMENTS

| | | |
|---|---|---|
| JP | 2000-068973 | 3/2000 |
| JP | 2000-261404 | 9/2000 |
| JP | 2000-286817 | 10/2000 |
| WO | WO 00/19605 | 4/2000 |

OTHER PUBLICATIONS

European Search Report dated Aug. 2, 2006.
Meyr H., et al. "Digital Communication Receivers-Synchronization, Channel Estimation, and Signal Processing" John Wiley & Sons, Inc., 1998, pp. 311-313, XP 002390794.
Supplementary Partial European Search Report dated Apr. 5, 2006.
Martin Oerder et al. "Digital Filter and Square Timing Recovery" IEEE Transactions on Communications, vol. 36, No. 5, May 1988, XP 000615025.

* cited by examiner

*Primary Examiner*—Chieh M. Fan
*Assistant Examiner*—Jason M. Perilla
(74) *Attorney, Agent, or Firm*—Katten Muchin Rosenman LLP

(57) ABSTRACT

Timing phase information is extracted from a power spectrum of a received signal whose amplitude is modulated per frame or sub-frame, and timing phase synchronization of the received signal is performed with the timing phase information. Also, a vector signal of the power spectrum is generated, the vector signal is multiplied by another vector signal to be rotated, a sign decision of the rotated vector signal is performed, a result of the sign decision is integrated to be outputted as the timing phase information, and a vector conversion is performed to the integrated value to be fed back as the other vector signal.

12 Claims, 15 Drawing Sheets

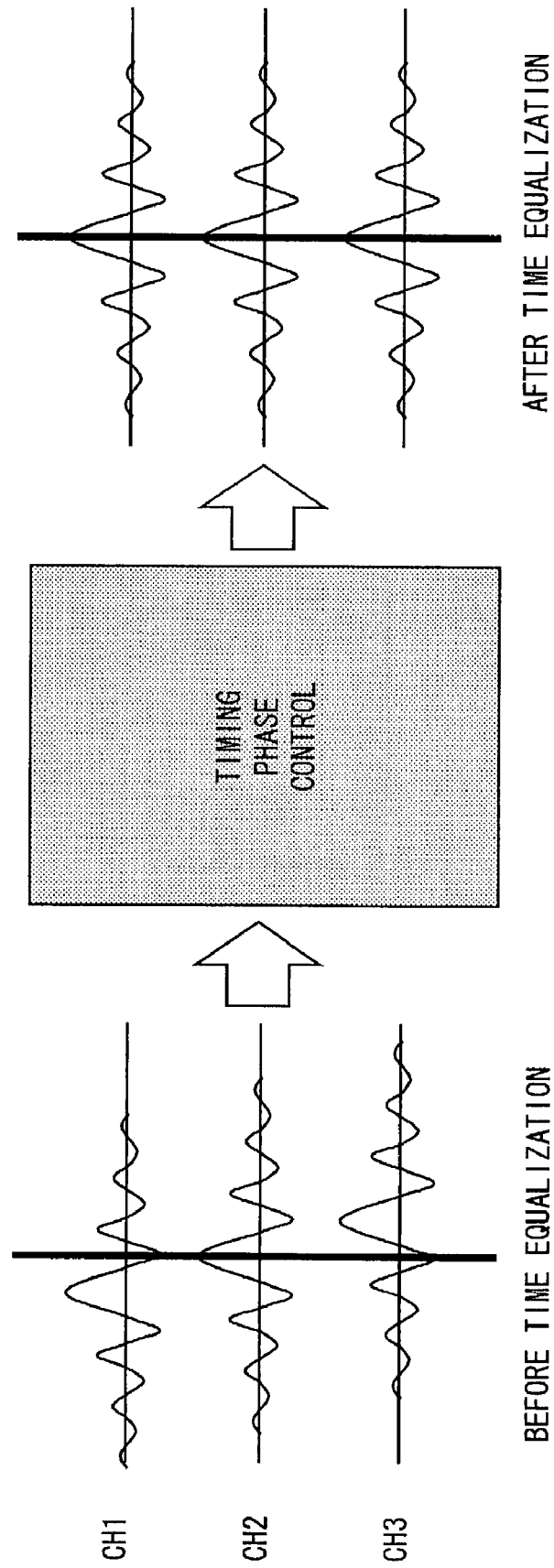

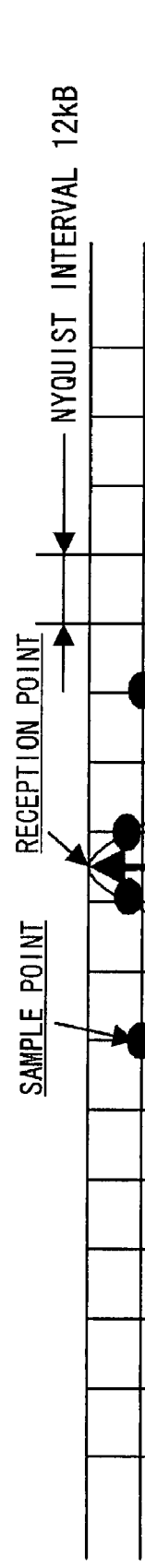
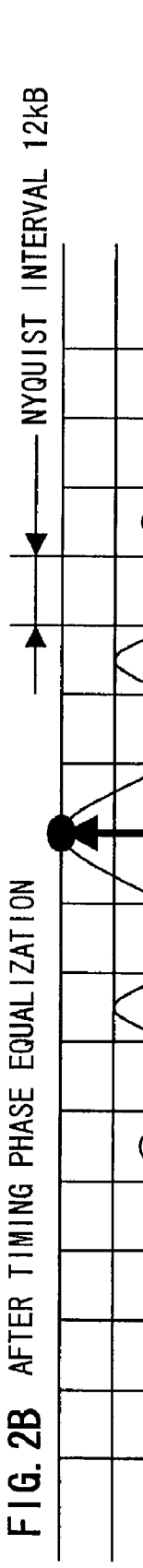
FIG. 2A BEFORE TIMING PHASE EQUALIZATION
FIG. 2B AFTER TIMING PHASE EQUALIZATION

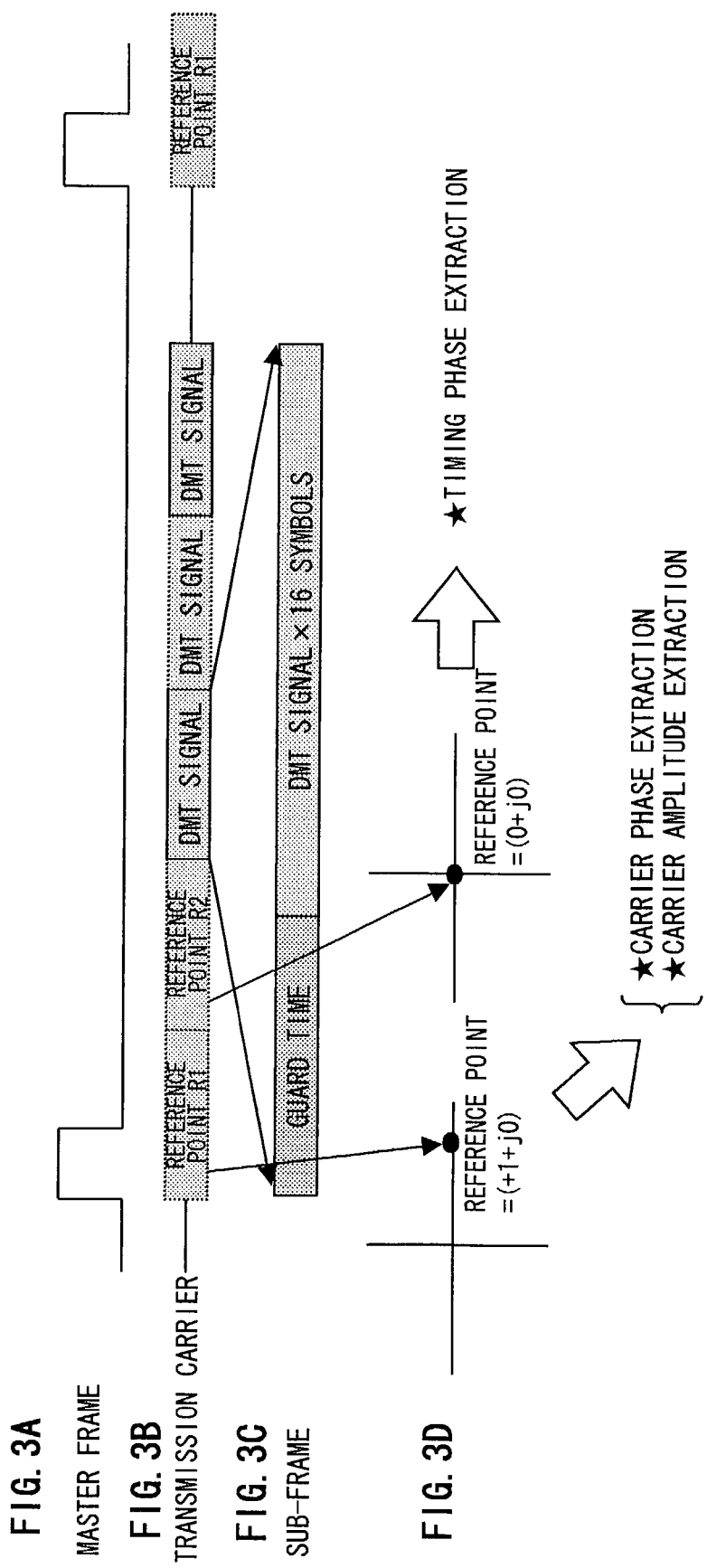

MASTER FRAME 600Hz

EXAMPLE OF AMPLITUDE MODULATION

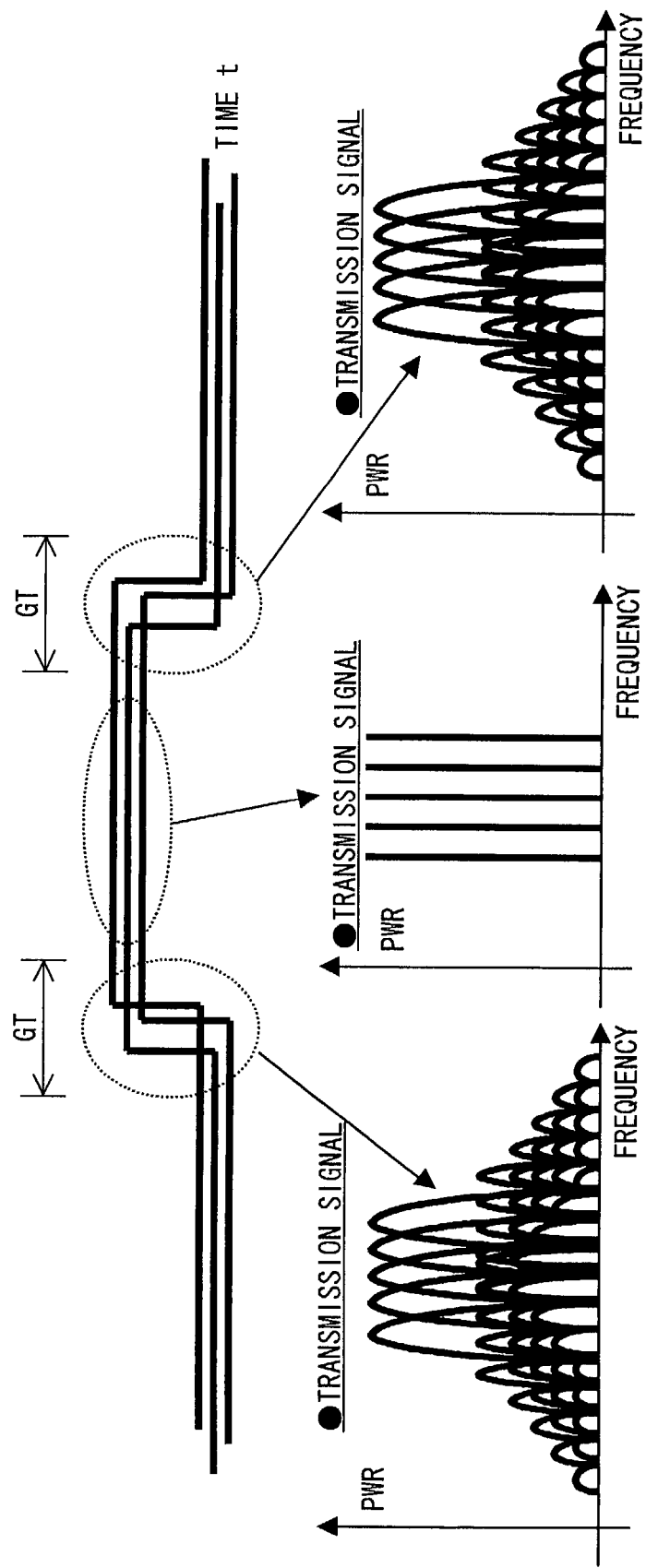

METHOD AND APPARATUS FOR TIME EQUALIZATION

This application is a continuation of international application number PCTJP00/08565, filed Dec. 4, 2000.

BACKGROUND OF THE INVENTION

1. Field of the Invention

The present invention relates to a method and an apparatus for time equalization, and in particular to a method and an apparatus for time equalization employed in modems or the like used at the time of a superfast data transmission with metallic wires.

2. Description of the Related Art

Generally, modems have been used for transmitting data with telephone lines, leased lines, private metallic wires, or the like, while in recent years, enhanced speed has been in demand for the processing of modem.

As a technical field where such modems are used, e.g. a power-line carrier communication can be mentioned. This power-line carrier communication includes an extremely large amount of random noises (white noises) from household electrical appliances such as an inverter, which blocks practical utilization of a high-speed data communication.

As recent countermeasures for such noises, a DMT (Discrete MultiTone) system and an OFDM (Orthogonal Frequency Division Multiplexing) system have been proposed. These DMT system and OFDM system adopt a multicarrier (multichannel) modulation system, that is a technology which avoids a signal from passing through a carrier band rich in noises. However, the multicarrier causes a group delay, as shown in FIG. 12B, in a transmission line on route, even if signals of channels are simultaneously transmitted from a transmission side as shown in FIG. 12A. As a result, arrival times of the channels on a time axis are different from each other on a reception side, as shown in FIG. 12C. For this reason, an inter-channel interference on a time axis arises on the reception side.

Namely, since low-speed square waves are transmitted in the DMT system or the OFDM system as shown in FIGS. 13A-13C, a normal transmission signal (tone) can be obtained, as shown in FIG. 13B, in a stable part of the square wave. However, in a variable part of the square wave, unnecessary bands of each channel have a waveform attenuating at a function of sinx/x as shown in FIGS. 13A and 13C.

Thus, in a line characteristic where the group delay arises, the signals of the channels interfere with each other on a time axis, and the inter-channel interference is avoided only in a flat part of the line characteristic.

On one hand, if a time corresponding to the interference part (i.e. time corresponding to a variable time of the square wave) is masked as a guard time GT as shown in FIGS. 13A-13C, it becomes possible to avoid the inter-channel interference. However, data transmission is disabled for this guard time GT, which makes a high-speed transmission difficult.

Accordingly, equalization between channels on a time axis is necessary in order to solve such a problem of a line group delay.

On the other hand, even in the same apparatus, the static characteristic greatly differs depending on ON/OFF state of power. In household electrical appliances such as a television using a switching power, two transfer functions A (or C) and B (or D) are alternately switched over every 120 Hz (in case a used frequency is 60 Hz) depending on whether the voltage is equal to or less than or more than a fixed value as shown in FIG. 14A. Namely, the transfer functions are switched over 240 times per second.

Thus, if the transfer function varies, a frequency characteristic (amplitude/phase) is divided into a solid line indicating the transfer functions A and C and a dotted line indicating the transfer functions B and D, as shown in FIG. 14B, both being greatly different from each other. Such a variation of the phase characteristic also includes the variation on a time axis.

Accordingly, since a high-speed followup performance is required for the transmission line in a modem or the like used for the power-line carrier communication, not only the high-speed equalization on a time axis as mentioned above, but also equalization on a frequency axis is required. If the equalization on a time axis is performed, it will contribute to the equalization on the frequency axis.

FIG. 15 shows a prior art for realizing the above-mentioned equalization on a time axis and a frequency axis. This prior art is composed of a time equalizer 1, a guard time remover 2, a DMT distributor 3 by an FFT (Fast Fourier Transform) calculation, a frequency equalizer (FEQ) 4, a determining portion (DEC) 5, and a code inverter 6, all being connected in series.

In this arrangement, the time equalizer 1 performs the equalization on a time axis to the received signal, and then the guard time remover 2 removes the guard time added on the transmission side. Furthermore, the DMT distributor 3 performs the FFT. Then, the frequency equalizer 4 performs the equalizations of the carrier amplitude and the carrier phase, and the determining portion 5 determines the code. Then, the code inverter 6 performs the code conversion such as Natural (N)/Gray (G) code conversion, a parallel (P)/serial (S) conversion, and descramble (DSCR) to obtain the received data RD.

In such a prior art, a special training signal is required in order to perform pull-in on a time axis at the time equalizer 1. This training signal requires a long time, and complicated processing for this training.

Namely, since a high-speed followup performance is required for the line characteristic which varies every 120 Hz, as mentioned above, at a multi point of 1:n, it is not possible to provide a long training time at each point, so that simple processing is required.

SUMMARY OF THE INVENTION

It is accordingly an object of the present invention to provide a method and an apparatus for performing time equalization to a line group delay of a received signal with a short training time.

In order to achieve the above-mentioned object, a time equalization method according to the present invention comprises: a first step of extracting timing phase information from a power spectrum of a received signal whose amplitude is modulated per frame or sub-frame; and a second step of performing timing phase synchronization of the received signal with this timing phase information.

Namely, frequency signals simultaneously transmitted by different channels are respectively received at different times, as shown in FIG. 1A, due to a line group delay characteristic.

In the present invention, by performing a timing phase control shown in FIG. 1B, a time equalization is performed to signal waveforms having arrived at different times respectively as shown in FIG. 1A in accordance with the line group delay characteristic, thereby aligning signal arrival times as shown in FIG. 1C.

Focusing on a waveform of a single channel, it is found, as shown in FIG. 2A, that an original reception point deviates from a sample point before performing the equalization of the timing phase by the present invention. In this state, the inter-channel interference arises.

After performing the equalization of the timing phase, as shown in FIG. 2B, in the present invention, the reception point coincides with the sample point at all the channels, so that the inter-channel interference is eliminated, and the problems shown in FIGS. 12A-12C and 13A-13C are solved, thereby enabling the high-speed transmission.

When an amplitude modulation is performed per frame, two reference points R1 and R2 including a zero-point are inserted into a transmission carrier as shown in FIG. 3B per frame that is a master frame shown in FIG. 3A, thereby enabling a timing phase synchronization to be performed only with these two reference point signals R1 and R2.

Also, when an amplitude modulation is performed per sub-frame, an amplitude modulation can be performed to a sub-frame that is a modulation unit between the frames that are master frames shown in FIG. 4A.

Accordingly, in either case where the amplitude modulation is performed per frame or per sub-frame, since timing phase information is extracted from a power spectrum of a received signal whose amplitude is modulated, and the timing phase synchronization is performed based thereon, it only takes a short time to extract the timing phase information, so that a long training signal is not required.

It is to be noted that FFT may be performed after the above-mentioned second step, or may be dividedly performed before and after the second step. In the latter case, there is a merit that the time equalization can be performed with a halved calculation amount.

Furthermore, at a subsequent stage of the second step, by extracting carrier amplitude information and carrier phase information from the received signal and by pulling in a timing phase, a carrier amplitude, and a carrier phase, a frequency equalization can be performed, thereby solving the problems of FIGS. 14A and 14B.

Also, the above-mentioned first step may comprise the steps of: generating a vector signal of the power spectrum, multiplying the vector signal by another vector signal to be rotated, performing a sign decision of the rotated vector signal, integrating a result of the sign decision to be outputted as the timing phase information, and performing a vector conversion of the integrated value to be fed back as the other vector signal.

Namely, since a calculation for taking out only the timing phase information is performed and other parameters are not required, the calculation amount is small, thereby enabling a high-speed timing phase to be pulled in.

Furthermore, if the above-mentioned step of performing the sign decision halves a result of the sign decision per calculation processing, much faster timing phase can be pulled in.

It is to be noted that a phase pull-in method comprising the steps of: generating a vector signal of a power spectrum of a received signal; multiplying the vector signal by another vector signal to be rotated; performing a sign decision of the rotated vector signal; integrating a result of the sign decision to be outputted as the timing phase information; and performing a vector conversion of the integrated value to be fed back as the other vector signal may be realized as the present invention.

An apparatus for realizing the above-mentioned time equalization method according to the present invention comprises: first means for extracting timing phase information from a power spectrum of a received signal whose amplitude is modulated per frame or sub-frame; and second means for performing timing phase synchronization of the received signal with the timing phase information.

The above-mentioned amplitude modulation of the first means may use two reference points including a zero-point per frame.

Furthermore, means for performing FFT may be provided after the above-mentioned second means, or means for performing FFT divided may be provided before and after the second means.

Moreover, at a subsequent stage of the second means, third means for extracting carrier amplitude information and carrier phase information from the received signal and for pulling in a timing phase, a carrier amplitude, and a carrier phase may further be provided.

Also, the first means may comprise; means for generating a vector signal of the power spectrum, means for multiplying the vector signal by another vector signal to be rotated, means for performing a sign decision of the rotated vector signal, means for integrating a result of the sign decision to be outputted as the timing phase information, and means for performing a vector conversion of the integrated value to be fed back as the other vector signal.

Furthermore, the means for performing the sign decision may halve a result of the sign decision per calculation processing.

Furthermore, in the present invention a phase pull-in apparatus comprising: means for generating a vector signal of a power spectrum of a received signal; means for multiplying the vector signal by another vector signal to be rotated; means for performing a sign decision of the rotated vector signal; means for integrating a result of the sign decision to be outputted as the timing phase information; and means for performing a vector conversion of the integrated value to be fed back as the other vector signal may be realized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 1A-1C are diagrams for illustrating a principle of a method and an apparatus for time equalization according to the present invention;

FIGS. 2A and 2B are waveform diagrams showing a timing phase equalization, focused on a single channel, of a method and an apparatus for time equalization according to the present invention;

FIGS. 3A-3D are time charts showing a reference point transmission for an amplitude modulation used for a method and an apparatus for time equalization according to the present invention;

FIGS. 13A-13C are waveform diagrams for illustrating inter-channel interference upon a signal point change;

FIGS. 14A and 14B are waveform diagrams showing a frequency characteristic change when a transfer function changes by ON/OFF state of power or the like.

DESCRIPTION OF THE EMBODIMENTS

Figures 4A, 4B:
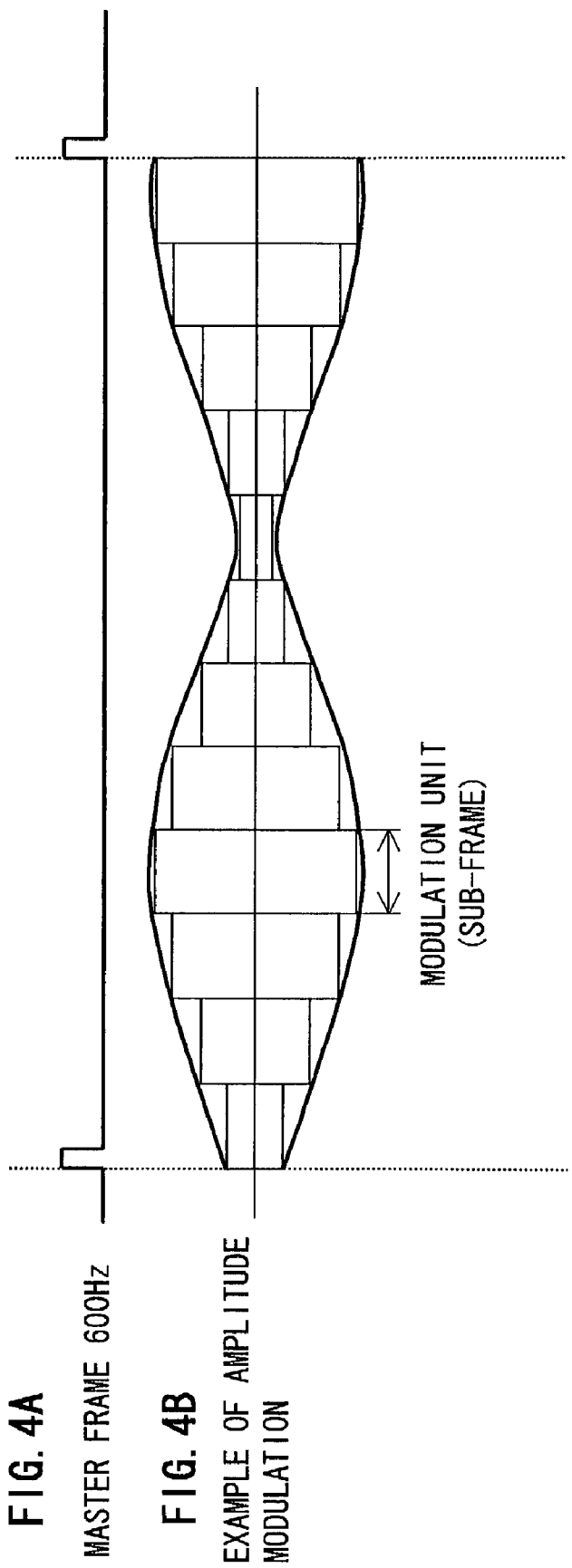
FIGS. 4A and 4B are waveform diagrams for illustrating an amplitude modulation per sub-frame used for a method and an apparatus for time equalization according to the present invention.
Figure 5:
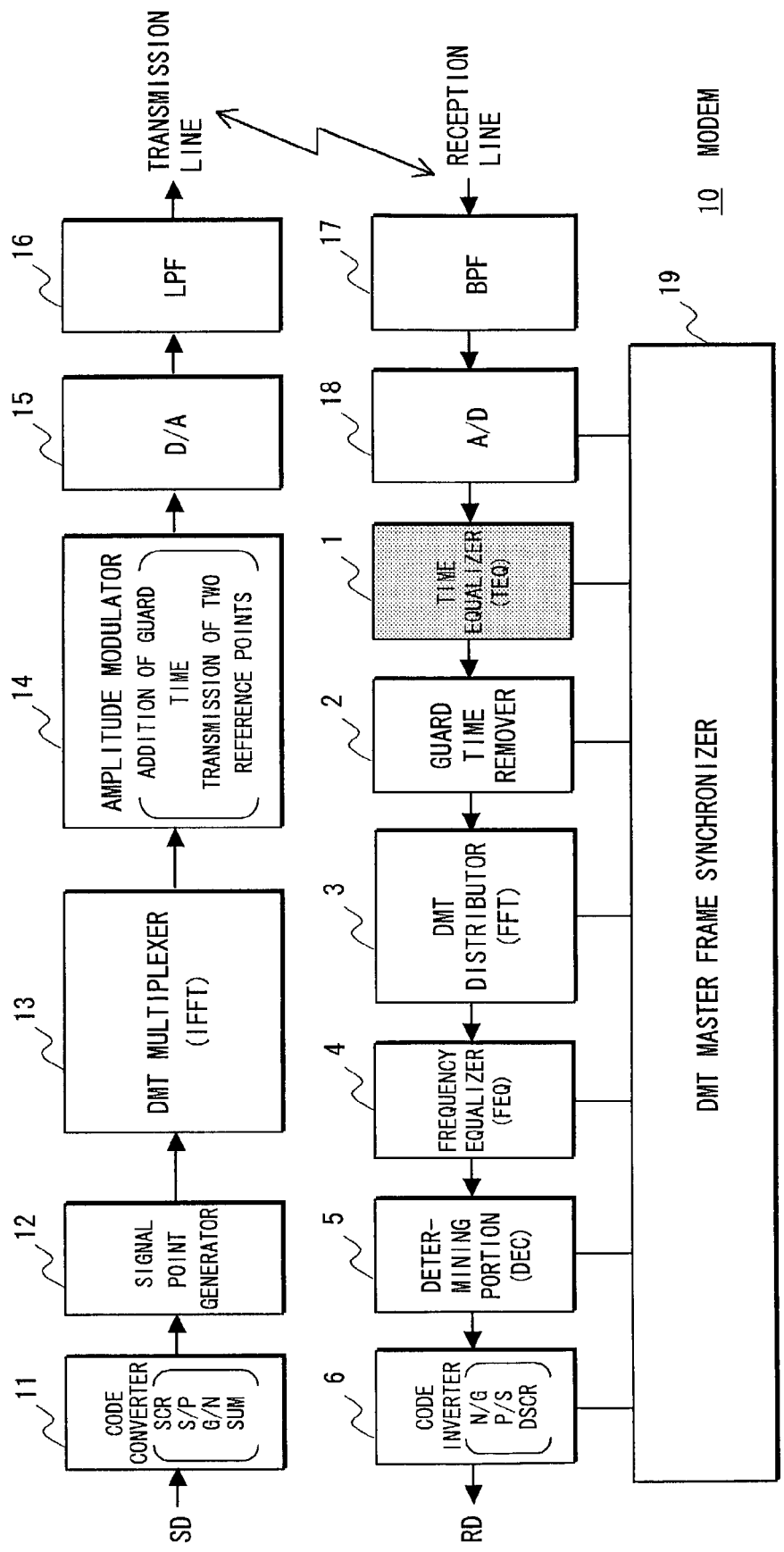
FIG. 5 is a block diagram showing an embodiment of a modem using a method and an apparatus for time equalization according to the present invention.

FIG. 5 shows an embodiment of a modem using a method and an apparatus for time equalization according to the present invention.

In this modem 10, a transmission system has an arrangement in which a code converter 11, a signal point generator 12, a DMT multiplexer (IFFT) 13, an amplitude modulator 14, a D/A converter 15, and a low-pass filter (LPF) 16 are connected in series in this order.

Also, a reception system has an arrangement in which a band-pass filter (BPF) 17, an A/D converter 18, a time equalizer 1, a guard time remover 2, a DMT distributor (FFT) 3, a frequency equalizer (FEQ) 4, a determining portion (DEC) 5, and a code inverter 6 are connected in series in this order. To each portion of this reception system, a master frame signal is provided from a DMT master frame synchronizer 19.

Firstly, as for the operation of the transmission system, scramble processing (SCR), a serial (S)/parallel (P) conversion, a gray (G)/natural (N) code conversion, and a sum calculation are performed to a transmission signal SD at the code converter 11. Then, the signal is outputted by the signal point generator 12 as a transmission signal having sample points of a Nyquist interval (12 kB) as shown in FIGS. 2A and 2B.

At the DMT multiplexer 13, the output signal from the signal point generator 12 is multiplexed, by an inverse FFT (IFFT) calculation, into a transmission signal as shown in FIG. 3B between the master frames shown in FIG. 3A.

At the amplitude modulator 14, a guard time is added to each sub-frame of this multiplexed signal as shown in FIG. 3C (as well as FIGS. 8A and 8B described later), and two reference points R1 and R2 including zero-points for performing an amplitude modulation are added to a DMT multiplexed signal (each DMT signal is composed of a DMT signal of 16 symbols=channels), as shown in FIG. 3D.

One reference point R1 is (1+j0), and the other reference point R2 is (0+j0). By using these reference points, the amplitude modulation is performed. Timing phase information is extracted from both reference points. A carrier amplitude and a carrier phase are extracted by using the former reference point R1 (for a single sub-frame). Accordingly, since the time equalization and the frequency equalization can be realized by two sub-frames, the long training signal becomes unnecessary.

The output signal of this amplitude modulator 14 is converted into an analog signal at the D/A converter 15. At the low-pass filter 16, a signal only in a low frequency band including a frequency band (10-450 kHz) of a power carrier wave, for example, is extracted to be provided to a transmission line.

As for the operation of the reception system, only a predetermined frequency band component (10-450 kHz for power carrier modem) is extracted from the signal received from the reception line by the band-pass filter 17 to be restored to a digital signal at the A/D converter 18.

Figure 6:
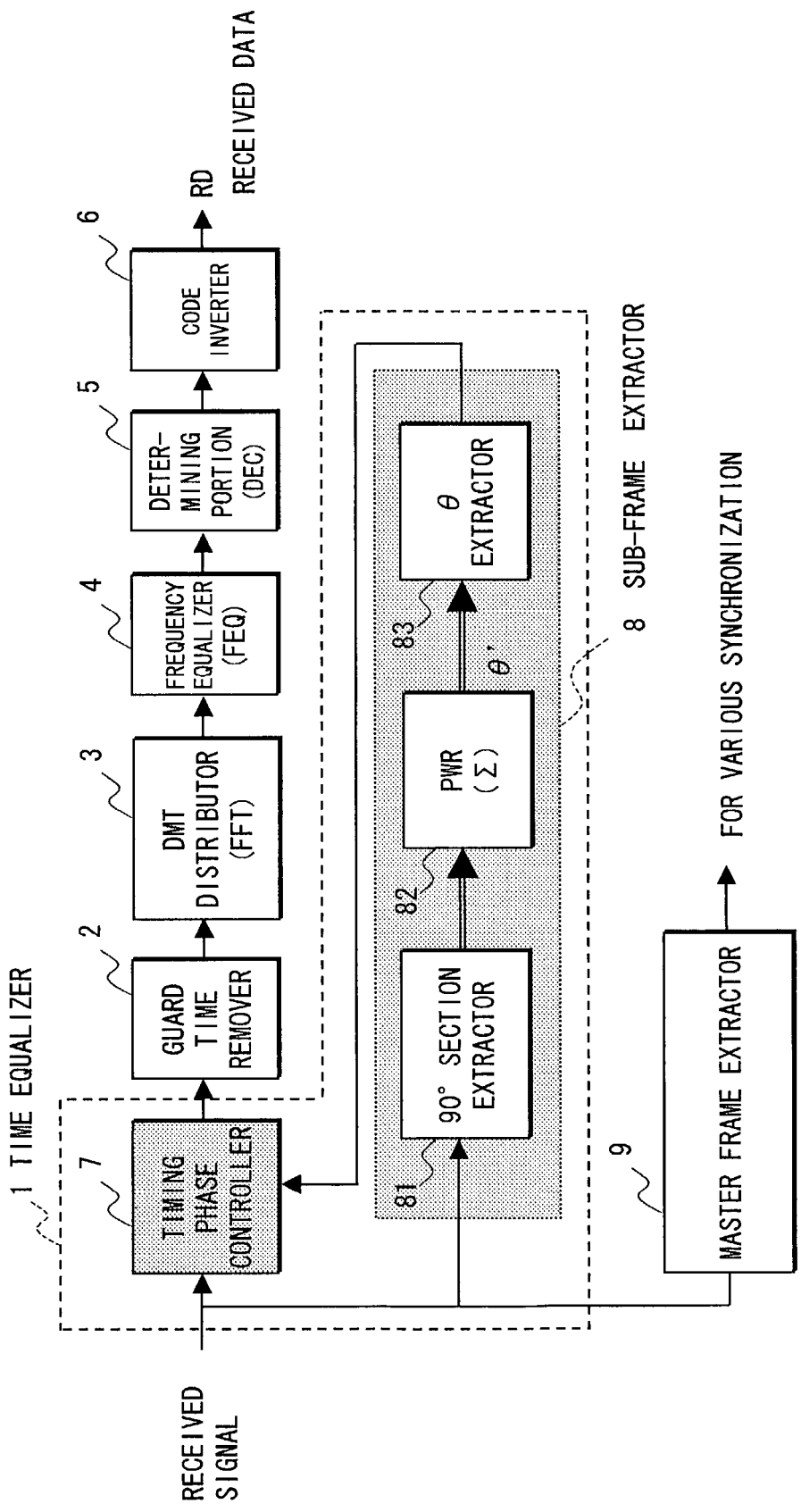
FIG. 6 is a block diagram specifically showing an embodiment of a time equalizer in a reception system of a method and an apparatus for time equalization according to the present invention.

Hereafter, the received signal is transmitted to the time equalizer 1. An embodiment of this time equalizer 1 is shown in FIG. 6. This embodiment is composed of a timing phase controller 7 for inputting the received signal from the A/D converter 18, and a sub-frame extractor 8 for extracting timing phase information θ from the received signal to be provided to the timing phase controller 7.

The sub-frame extractor 8 is further composed of a 90° section extractor 81, a power calculator (PWR) 82, and a θ extractor 83. It is to be noted that a master frame extractor 9 extracts a master frame from the received signal to be provided to the DMT master frame synchronizer 19 shown in FIG. 5 for use in various synchronizing signal.

Figure 7:
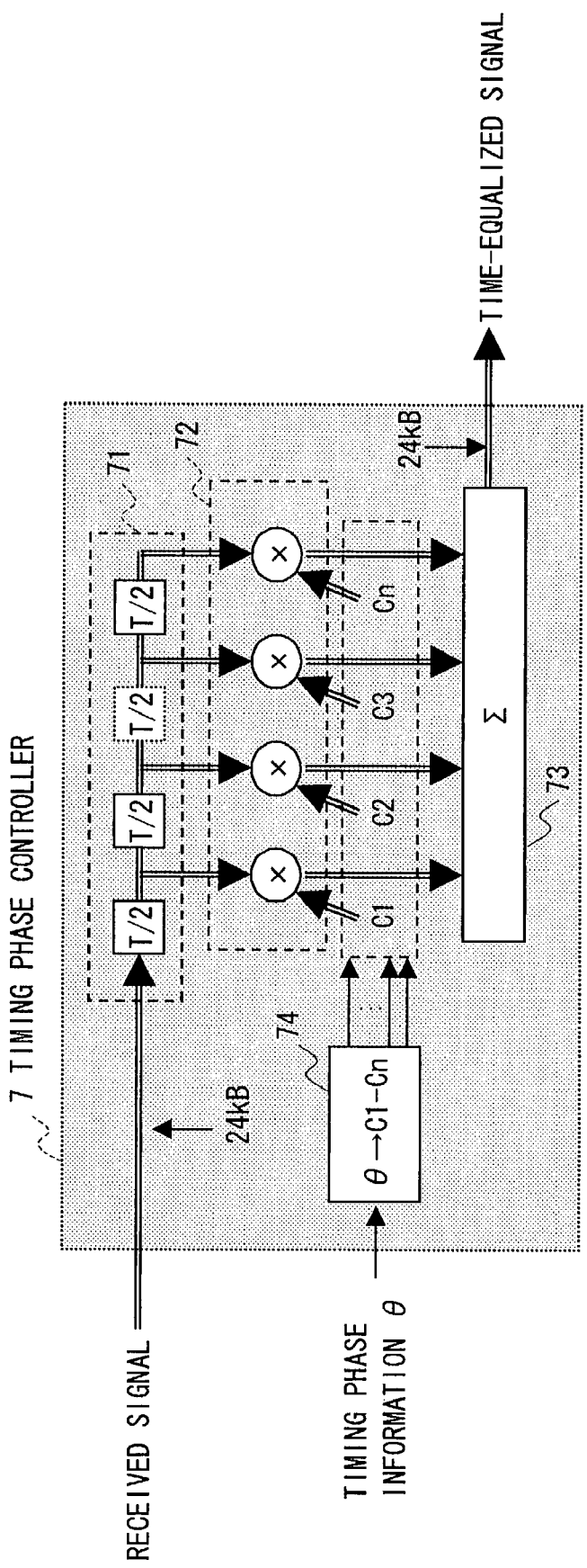
FIG. 7 is a circuit diagram showing an embodiment of a timing phase controller shown in FIG. 6.

Also, for the timing phase controller 7 shown in FIG. 6, as shown in FIG. 7, a transversal filter known as e.g. Japanese Patent Application Laid-open No.10-224271 can be used, which is composed of a delay circuit 71 for delaying the received signal at intervals of sample points, a multiplication circuit 72 for multiplying the output signal from the delay circuit 71 by coefficients C1-Cn, an addition circuit 73 for adding the output signal of the multiplication circuit 72, and a converter 74 composed of e.g. a table for converting the timing phase information θ from the sub-frame extractor 8 into the above-mentioned coefficients C1-Cn.

The operation of this time equalizer 1 will now be described referring to FIGS. 8A-8G, FIG. 9, and FIGS. 10A-10H.

Figure 8:
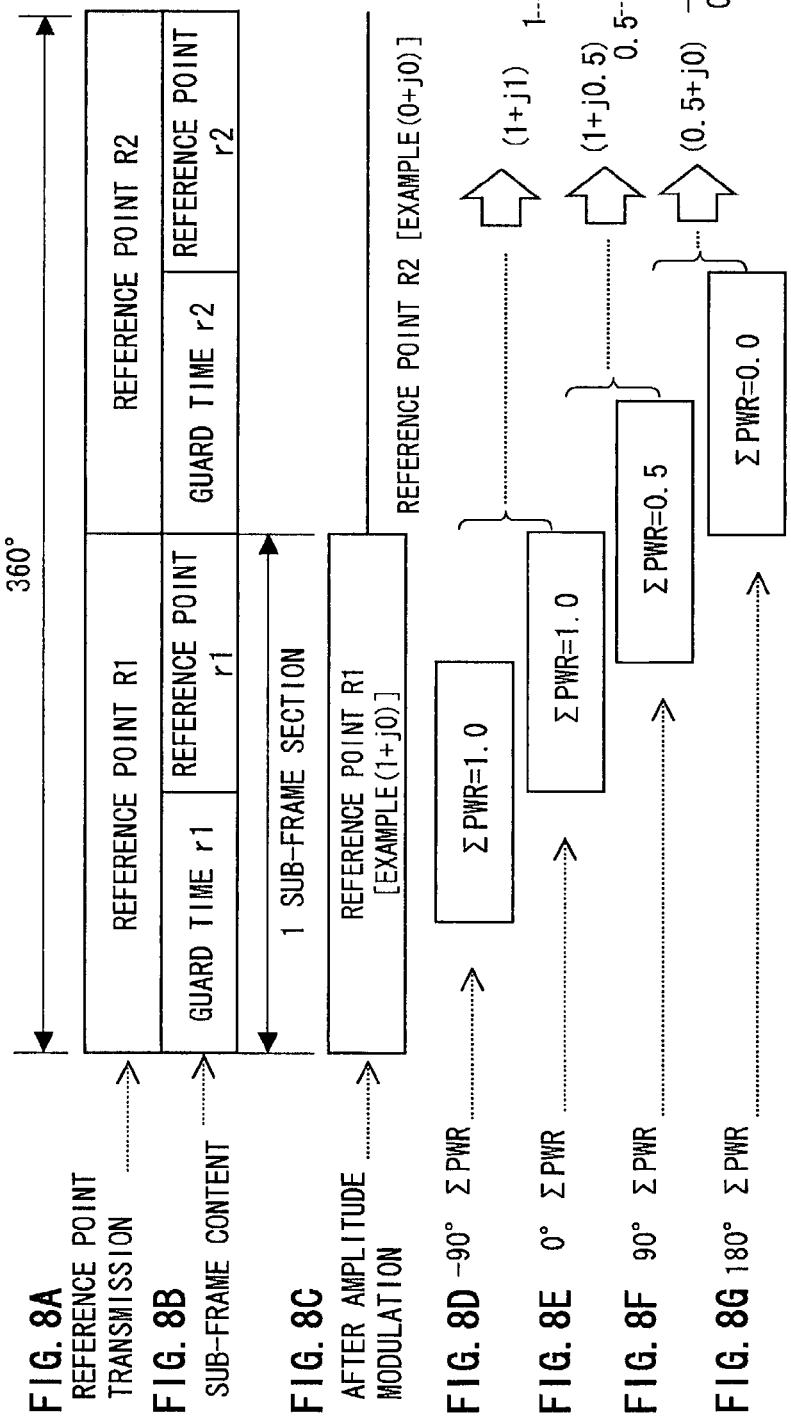
FIGS. 8A-8G are diagrams for illustrating a process of obtaining a vector signal of a power spectrum in a sub-frame extractor shown in FIG. 6.

Firstly, when the reference points R1 and R2 inserted into two sub-frames as shown in FIGS. 8A and 8B are received in the state where the amplitude modulation of a modulation rate 100% is applied as shown in FIG. 8C, and when two sub-frames in combination are supposed to form 360°, the 90° section extractor 81 in the sub-frame extractor 8 cuts 90° sections at 90° intervals, as shown in FIGS. 8D-8G, to be provided to the power calculator 82.

Since the power calculation is performed to the 90° section only at the reference point R1 in the power calculator 82 in case of FIG. 8D, its integrated average is "1". When the power calculation section is shifted by 90°, as shown in FIG. 8E, the integrated average is "1" similarly. When the power calculation section is further shifted by 90° in FIG. 8F, the power calculation is performed to the 90° section half of which is at the reference point R1 and the other half of which is at the reference point R2, thereby the integrated average assuming "0.5". When the power calculation section is further shifted by 90°, the power calculation is performed only within the reference point R2 as shown in FIG. 8G, so that the integrated average assumes "0".

Since the calculation result of this power calculator 82 is a scalar, adjoining integrated averages are added for vectorization. As a result, if the power integrated averages of FIGS. 8D and 8E are vectorized, the vector assumes (1+j1) as shown on the right side of FIGS. 8D and 8E. Similarly, in case of FIGS. 8E and 8F, it assumes (1+j0.5), and in case of FIGS. 8F and 8G, it is outputted as (0.5+j0).

Thus, with the power calculations continued, the above-mentioned addition result is rotated about an origin O as a vector signal as shown in FIGS. 8D-8G. A line L connecting the origin or a center point O to a point (0+j0) at this time is a reference line, and an angle θ' for this line is provided to the θ extractor 83 shown in FIG. 9 as a vector signal. The received signal is subject to a timing phase control in accordance with the reference line L.

Thus, by calculating and integrating respective power of the received signals whose time axes are different from each other, the timing phase (reference point phase) of the received signals can be obtained. If a time equalization is performed accordingly, DMT signals of 16 channels are multiplexed into sub-frames in the DMT multiplexed signal, so that the arrival times of channels coincide with each other as shown in FIG. 1C.

The θ extractor 83 is composed of a multiplication circuit 83a, a sign decision portion 83b, an addition circuit 83c, a delay circuit 83d, and a vector signal generator 83e. Firstly, at the multiplication portion 83a, the vector signal θ' is multiplied by another vector signal having phase information of radius=1.0 generated at the vector signal generator 83e.

Then, the vector signal θ' takes a phase rotation of Δθ, and the multiplication circuit 83a extracts only an imaginary component from this signal to be transmitted to the sign decision portion 83b.

If the sign of this imaginary signal is +, the sign decision portion 83b outputs [FFFF]. If the sign is −, the sign decision portion 83b outputs [0001] as the decision result to be provided to the adder 83b. At the addition circuit 83c, the phase information previously sampled through the delay circuit 83d is added thereto, so that a new phase information is provided.

Since an integration circuit is composed of the addition circuit 83c and the delay circuit 83d, when the integrated value θ is transmitted to the vector signal generator 83e, the vector signal generator 83e performs a cos/sin conversion, converts a scalar input θ into a vector output θ, and provides θ information of radius=1.0 to the multiplication circuit 83a.

By repeating such an operation a plurality of times until the next vector signal θ' is inputted, a complex conjugate value θ (corresponding to an amended amount of θ') of the vector signal θ' can be outputted from the delay circuit 83d as the timing phase information.

It is to be noted that this operation is performed within two sub-frames having the reference points R1 and R2 shown in FIG. 8A, and the timing phase information θ is outputted every time the vector signal θ' is provided to the extractor 83, thereby enabling the timing phase information to be sufficiently pulled in. Accordingly, a long training signal is not required.

Figure 9:
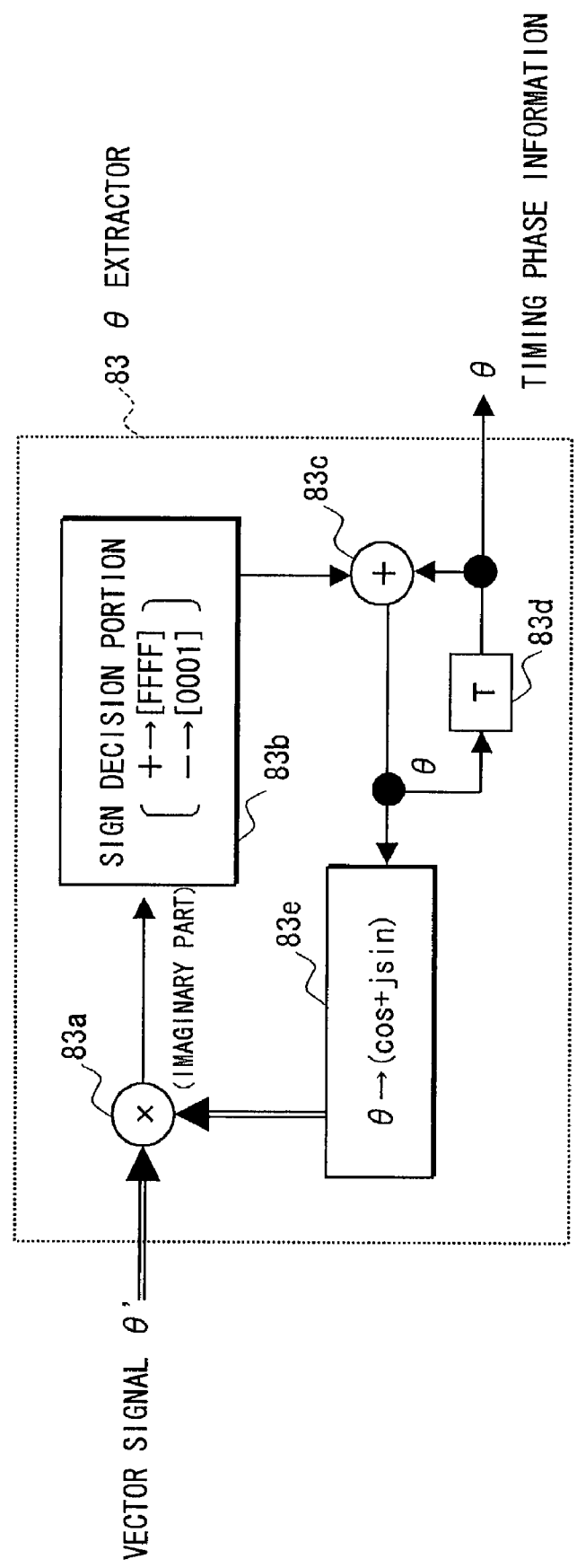
FIG. 9 is a circuit diagram showing an embodiment of a timing phase information (θ) extractor shown in FIG. 6.

Also, in embodiment of the sign decision portion 83b shown in FIG. 9, a fixed decision result is outputted at all times depending on + or −. However, by changing this decision result, much faster pull-in can be achieved.

Figure 10C:
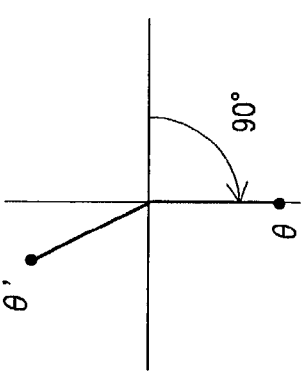
FIGS. 10A-10H are graphs showing an operational modification of a sign decision portion shown in FIG. 9.
Figure 10F:
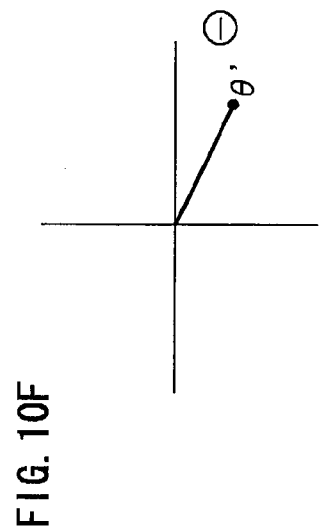
Figure 10B:
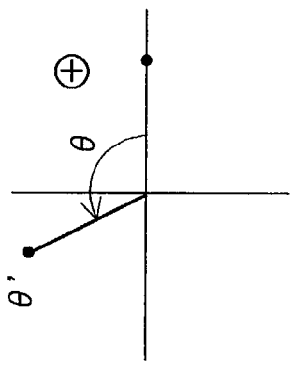
Figure 10E:
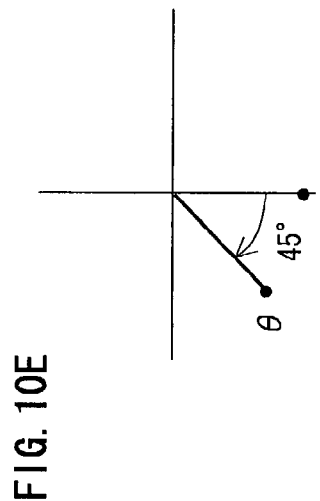
Figure 10H:
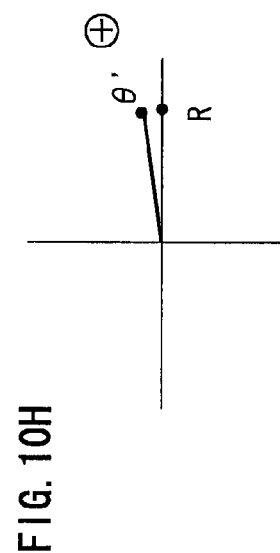
Figure 10A:
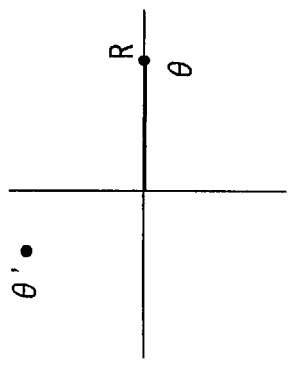

Namely, since a vector signal θ of the vector signal generator 83e is originally a reference vector R (1+j0) made by shifting the point (0+j0) of the reference line L shown in FIGS. 8D-8G to a point (−0.5+j0.5) and by rotating the resultant by 135°, θ is coincident with the reference vector R (1+j0) as shown in FIG. 10A. Since the vector signal θ' coming into the multiplication circuit 83a is not rotated by the multiplication circuit 83a at this time, the input signal of the sign decision portion 83b remains as θ', so that as shown in FIG. 10B, this θ' is +.

Figure 10D:
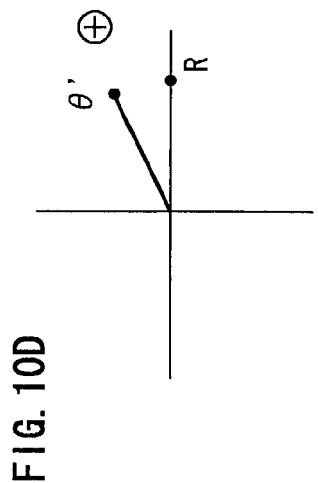

The sign decision portion 83b, as shown in FIG. 10C, outputs the decision result for rotating θ by 90° in the direction of − (clockwise), so that the vector signal θ' is rotated by 90° in the direction of − as shown in FIG. 10D to be brought near to the reference point R.

Since the vector signal θ' is still + in this state, the vector signal is further rotated by 45° in the direction of − as shown in FIG. 10E, and the vector θ' now assumes − as shown in FIG. 10F.

Figure 10G:
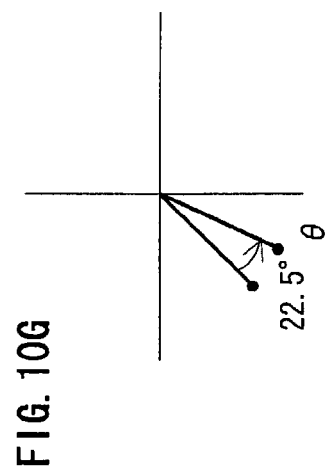

If the vector signal is further rotated by 22.5° in the direction of + as shown in FIG. 10G, the vector signal θ' is brought nearer to the reference point R as shown in FIG. 10H.

Thus, by the decision angle being halved in such an order of ±90°→±45°→±22.5°→±11.25°→..., much faster timing phase pull-in can be realized.

In the example of FIGS. 10A-10H, the integrated value of the timing phase information θ=−90°, 45°, +22.5°, +11.250, +... can be obtained.

Supposing that the θ extractor 83 is composed of a DSP (Digital Signal Processor) in this case, the value which the DSP can obtain for an angle of ±180° is usually ±2.0. Therefore, the value outputted from the sign decision portion 83b is indicated by two's complement number as follows:

| | |
|---|---|
| +2.0 → +180° | [7FFF] |
| +1.0 → +90° | [4000] |
| +0.5 → +45° | [2000] |
| 0.0 → 0° | [0000] |
| −1.0 → −90° | [C000] |
| −2.0 → −180° | [8000] |

The timing phase information θ thus obtained is provided to the timing phase controller 7 shown in FIG. 6. The timing phase controller 7, as shown in FIG. 7, converts the timing phase information θ into coefficients C1-Cn at the converter 74, which are provided to the multiplication circuit 72. The multiplication circuit 72 multiples the sampling outputs from the delay circuit 71 by coefficients C1-Cn.

Then, by mutually adding the multiplication results of the multiplication portion 72 at the adder 73, a time-equalized signal can be obtained. It is to be noted that this timing phase controller 7 can output the time-equalized signal based on the timing phase information θ by the above-mentioned known arrangement.

Figure 15:
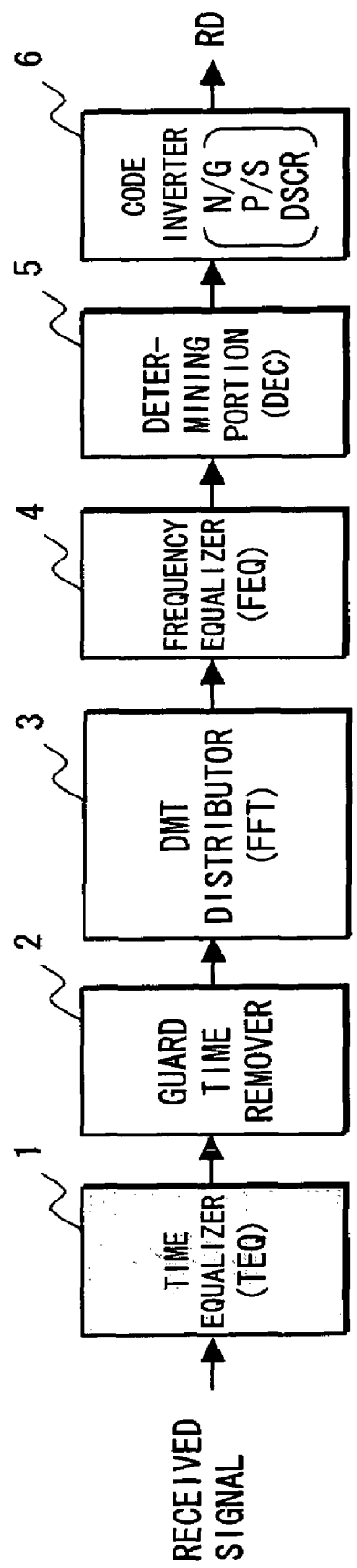
FIG. 15 is a block diagram showing a prior art time equalization system.

Hereafter, as shown in FIG. 6, the time-equalized signal from the timing phase controller 7 is transmitted to the guard time remover 2, the DMT distributor 3, the frequency equalizer 4, the determining portion 5, and the code inverter 6. This operation is the same as that shown in FIG. 15. Also, the frequency equalizer 4 performs a frequency equalization only by using the reference point R1 shown in FIG. 3B.

Figure 11:
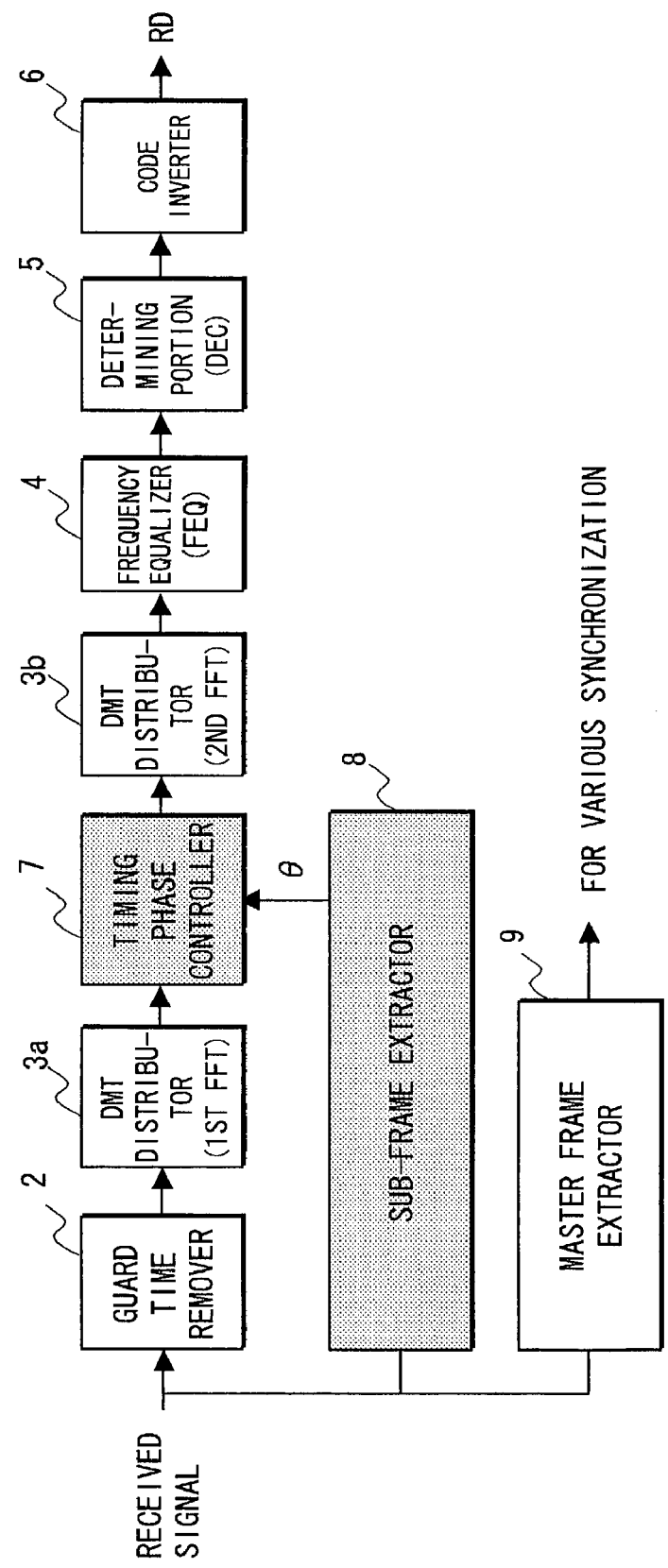
FIG. 11 is a block diagram showing a modification of a method and an apparatus for time equalization according to the present invention.
Figures 12A, 12B, 12C:
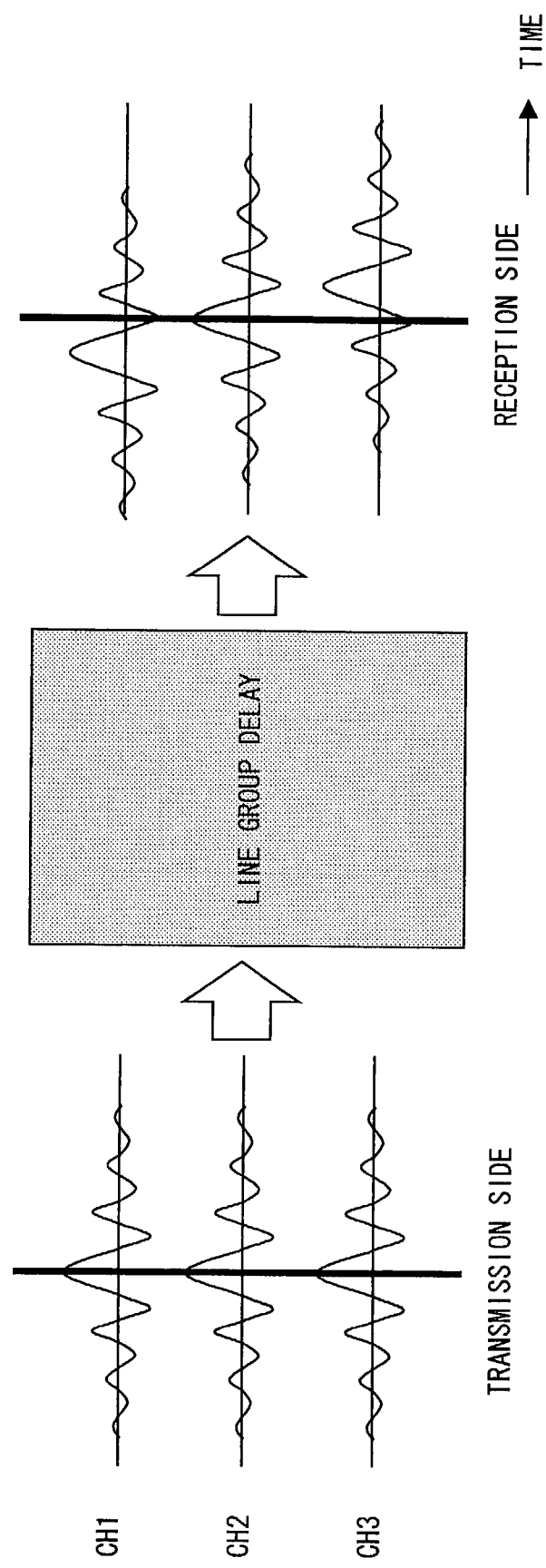
FIGS. 12A-12C are waveform diagrams for illustrating a prior art problem of a line group delay.
Figures 14A, 14B:
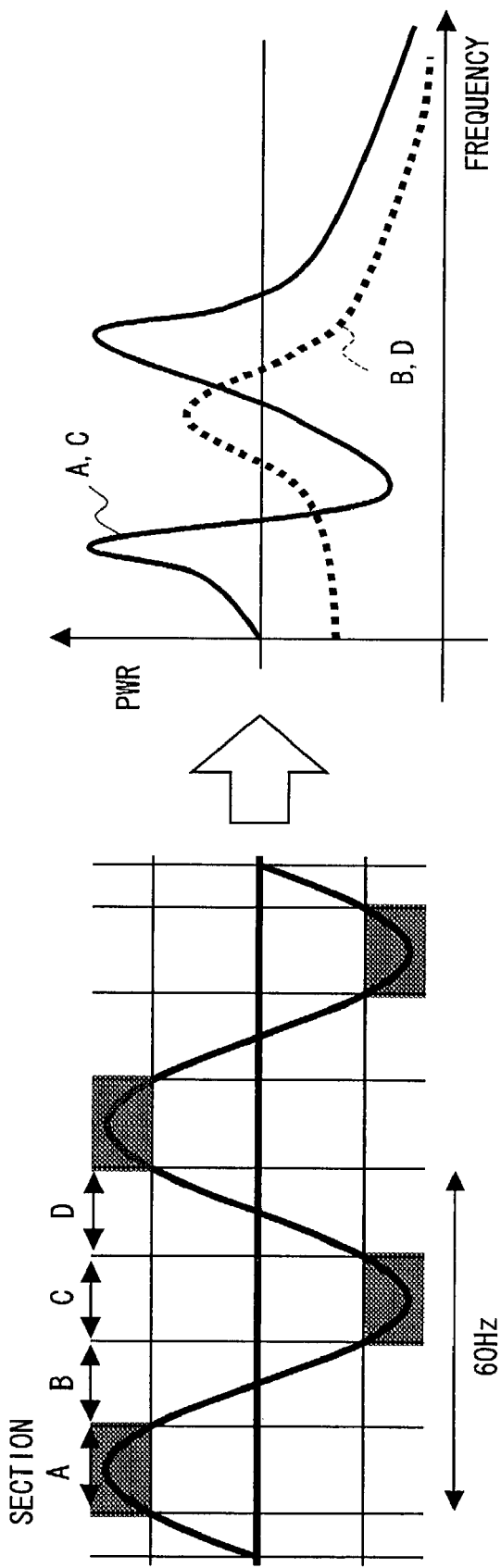

FIG. 11 shows a modification of the embodiment of the present invention shown in FIG. 6. While the FFT calculation is performed to the time-equalized signal from the timing phase controller 7 at the DMT distributor 3 through the guard time remover 2 in the embodiment of FIG. 6, the FFT calculation is divided into two in the modification of FIG. 11. Namely, the first FFT calculation is performed at a DMT distributor 3a provided at a preceding stage of the timing phase controller 7, and the second FFT calculation is performed at a DMT distributor 3b provided at a subsequent stage.

Thus, since the FFT processing is performed once at the DMT distributor 3a, a sampling frequency becomes low, which effects enhancing the speed of calculation at the timing phase controller 7. It is preferable that the guard time remover 2 is provided at the preceding stage of the DMT distributor 3a in this case.

It is to be noted that while the guard time is added in the above-mentioned description, a guard time period can be greatly shortened by the time equalization according to the present invention compared with an example of FIGS. 13A-13C, which does not block the enhancement of the speed.

As described above, a method and an apparatus for time equalization are arranged so that timing phase information is extracted from a power spectrum of a received signal whose amplitude is modulated per frame or sub-frame; and timing phase synchronization of the received signal is performed with the timing phase information. Therefore, the time equalization can be realized without requiring a long training period Also, it becomes possible to realize a much faster phase pull-in by generating a vector signal of the power spectrum, by multiplying the vector signal by another vector signal to be rotated, by performing a sign decision of the rotated vector signal, by integrating a result of the sign decision to be outputted as the timing phase signal, and by performing a vector conversion of the integrated value to be fed back as the other vector signal.

What we claim is:

1. A time equalization method which performs an equalization on a time axis for a plurality of received signals comprising:
    a first step of extracting timing phase information from a power spectrum of each of the plurality of received signals whose amplitudes are each modulated by using two reference point signals including a zero-point per frame, the first step comprising:
generating a first vector signal of the power spectrum,
multiplying the first vector signal by a second vector signal to rotate the first vector signal,
    performing a sign decision of the rotated first vector signal, integrating a result of the sign decision to be outputted as the timing phase information, and
    performing a vector conversion of the integrated value to be fed back as the second vector signal; and
    a second step of performing timing phase, synchronization of each of the plurality of received signals with the timing phase information.

2. The time equalization method as claimed in claim 1 wherein a Fast Fourier Transformation (FFT) is performed after the second step.

3. The time equalization method as claimed in claim 1 wherein a Fast Fourier Transformation (FFT) is dividedly performed before and after the second step.

4. The time equalization method as claimed in claim 1, further comprising, at a subsequent step of the second step, a third step of extracting carrier amplitude information and carrier phase information from each of the plurality of received signals and of acquiring a timing phase, a carrier amplitude, and a carrier phase.

5. The time equalization method as claimed in claim 1, wherein the step of performing the sign decision comprises the step of halving a result of the sign decision per calculation processing.

6. A phase acquiring method for time equalization comprising the steps of:
    generating a first vector signal of a power spectrum of a received signal; multiplying the first vector signal by a second vector signal to rotate the first vector signal;
    performing a sign decision of the rotated first vector signal; integrating a result of the sign decision to be outputted as timing phase information;
    performing a vector conversion of the integrated value to be fed back as the second vector signal; and
    performing timing phase synchronization of the received signal with the timing phase information.

7. A time equalization apparatus which performs an equalization on a time axis for a plurality of received signals comprising:
    first means for extracting timing phase information from a power spectrum of each of the plurality of received signals whose amplitudes are each modulated by using two reference point signals including a zero-point per frame, the first means comprising: means for generating a first vector signal of the power spectrum,
    means for multiplying the first vector signal by a second vector signal to rotate the first vector signal,
    means for performing a sign decision of the rotated first vector signal,
    means for integrating a result of the sign decision to be outputted as the timing phase information, and
    means for performing a vector conversion of the integrated value to be fed back as the second vector signal; and
    second means for performing timing phase synchronization of each of the plurality of received signals with the timing phase information.

8. The time equalization apparatus as claimed in claim 7, further comprising means for performing a Fast Fourier Transformation (FFT) after the second means.

9. The time equalization apparatus as claimed in claim 7, further comprising means for dividedly performing a Fast Fourier Transformation (FFT) before and after the second means.

10. The time equalization apparatus as claimed in claim 7, further comprising, at a subsequent step of the second means, third means for extracting carrier amplitude information and carrier phase information from each of the plurality of received signals and for acquiring a timing phase, a carrier amplitude, and a carrier phase.

11. The time equalization apparatus as claimed in claim 7, wherein the means for performing the sign decision comprises means for halving a result of the sign decision per calculation processing.

12. An acquiring apparatus for equalization of a signal phase of received signals comprising:
    means for generating a first vector signal of a power spectrum of a received signal;
    means for multiplying the first vector signal by a second vector signal to rotate the first vector signal;
    means for performing a sign decision of the rotated first vector signal; means for integrating a result of the sign decision to be outputted as the timing phase information;
    means for performing a vector conversion of the integrated value to be fed back as the second vector signal; and
    means for performing timing phase synchronization of the received signal with the timing phase information.

* * * * *